United States Patent
Lin et al.

(10) Patent No.: US 7,627,215 B2
(45) Date of Patent: Dec. 1, 2009

(54) OPTICAL INTERMEDIARY COMPONENT AND OPTICAL DAUGHTER CARD MODULE

(75) Inventors: Shin-Way Lin, Taoyuan County (TW); Ben-Hwa Jang, Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 23 days.

(21) Appl. No.: 12/110,358

(22) Filed: Apr. 28, 2008

(65) Prior Publication Data

US 2009/0169155 A1 Jul. 2, 2009

(30) Foreign Application Priority Data

Dec. 28, 2007 (TW) ............... 96151030 A

(51) Int. Cl.
*G02B 6/26* (2006.01)
*G02B 6/42* (2006.01)
*G02B 6/36* (2006.01)

(52) U.S. Cl. ............... 385/48; 385/31; 385/33; 385/34; 385/38; 385/39; 385/43; 385/50; 385/88; 385/92; 385/93

(58) Field of Classification Search ............ 385/48, 385/93
See application file for complete search history.

(56) References Cited

U.S. PATENT DOCUMENTS

| | | | |
|---|---|---|---|
| 5,600,741 A * | 2/1997 | Hauer et al. .......... 385/35 |
| 5,757,989 A * | 5/1998 | Yoshimura et al. ........ 385/14 |
| 6,152,610 A * | 11/2000 | Hattori ................ 385/88 |
| 6,236,786 B1 * | 5/2001 | Aoki et al. ............. 385/50 |
| 6,236,788 B1 * | 5/2001 | Moisel ................ 385/52 |
| 6,343,171 B1 * | 1/2002 | Yoshimura et al. ........ 385/50 |
| 6,694,068 B2 * | 2/2004 | Parker ................ 385/14 |
| 6,952,505 B2 * | 10/2005 | Aldridge et al. .......... 385/14 |
| 6,976,793 B2 * | 12/2005 | Tourne ................ 385/88 |
| 7,010,192 B2 * | 3/2006 | Joo et al. .............. 385/30 |
| 7,082,238 B2 * | 7/2006 | Nishimura ............. 385/48 |
| 7,149,389 B2 * | 12/2006 | Yoon et al. ............. 385/43 |
| 7,178,994 B2 * | 2/2007 | Tourne ................ 385/89 |
| 7,346,242 B2 * | 3/2008 | Morlion et al. .......... 385/52 |
| 7,362,934 B2 * | 4/2008 | Hamano .............. 385/49 |
| 2002/0191911 A1 * | 12/2002 | Ukrainczyk et al. ....... 385/33 |

* cited by examiner

*Primary Examiner*—Ryan Lepisto
(74) *Attorney, Agent, or Firm*—Jianq Chyun IP Office

(57) ABSTRACT

An optical intermediary component is suitable for guiding a light from an output optical path into an input optical path. The optical intermediary component includes a light guiding portion extending along a light axis. The light guiding portion has a light incident surface and a light emitting surface at two opposite ends thereof respectively. The light from the output optical path passes through the light incident surface and the light emitting surface of the light guiding portion in sequence, and is guided into the input optical path. The area of the light incident surface is greater than that of the light emitting surface. Therefore, a high assembly tolerance may reduce the manufacturing and assembly cost.

20 Claims, 6 Drawing Sheets

OPTICAL INTERMEDIARY COMPONENT AND OPTICAL DAUGHTER CARD MODULE

CROSS-REFERENCE TO RELATED APPLICATION

This application claims the priority benefit of Taiwan application serial no. 96151030, filed on Dec. 28, 2007. The entirety of the above-mentioned patent application is hereby incorporated by reference herein and made a part of specification.

BACKGROUND OF THE INVENTION

1. Field of the Invention

The present invention generally relates to an optical daughter card module, in particular, to an optical intermediary component applied in an optical daughter card module.

2. Description of Related Art

With rapid progress in multimedia applications, the bandwidth of the conventional metal conductor connection technology is coming to a limit. The broadband and anti-electromagnetic interference characteristics of the optical connection technology meet the technical requirements in the development of multimedia applications. Optical fiber is a light guiding element for transmitting telecommunication signals through the total reflection of light. As the optical fiber is advantageous in achieving high frequency, interference proof, and long-distance transmission with regard to signal transmission, an optical fiber network system has become an indispensable part of the network. In addition, the technology of introducing planar light circuits (PLCs) onto planar circuits is more and more applied in integrated circuits and printed circuit boards, such that the optical fiber networks gradually constitute an optical network.

In order to achieve a high transmission speed, an optical path generally adopts a single-mode or small core transmission structure. Thereby, the outer diameter of the structure is normally lower than 100 μm or even 10 μm, which relatively raises the tolerance requirement on assembly. Restricted by the outer diameter, a precise assembly technology and tools are needed, but may indirectly lead to higher assembly and manufacturing costs of relative elements, thus limiting the application thereof.

SUMMARY OF THE INVENTION

Accordingly, the present invention is directed to an optical intermediary component, which is suitable for guiding a light from an output optical path into an input optical path.

The present invention is directed to an optical daughter card module, which has an optical intermediary component suitable for guiding a light from an output optical path into an input optical path.

The present invention is directed to an optical intermediary component suitable for guiding a light from an output optical path into an input optical path. The optical intermediary component includes a light guiding portion extending along a light axis. The light guiding portion has a light incident surface and a light emitting surface at two opposite ends thereof respectively relative to the light axis. The light from the output optical path passes through the light incident surface and the light emitting surface, and is guided into the input optical path. The area of the light incident surface is greater than that of the light emitting surface.

The present invention is directed to an optical daughter card module, which is suitable for being detachably installed on an optical parent card module. The optical parent card module includes a parent card, an input optical path in the parent card, and a parent card positioning component fixed on the parent card. The optical daughter card module includes a daughter card positioning component, a daughter card, and an optical intermediary component. The daughter card positioning component and the parent card positioning component both provide spaces for circuit connection. The daughter card positioning component is detachably installed on the parent card positioning component. The daughter card is fixed to the daughter card positioning component, and has an output optical path. The optical intermediary component is fixed to the daughter card positioning component, and has a light guiding portion. The light guiding portion extends along a light axis, and has a light incident surface and a light emitting surface relative to the light axis respectively. A light from the output optical path passes through the light incident surface and the light emitting surface, and is guided into the input optical path. The area of the light incident surface is greater than that of the light emitting surface.

In the present invention, the area of the light incident surface is greater than that of the light emitting surface in the light guiding portion, so a high alignment tolerance is provided between the output optical path and the optical intermediary component, thus making the assembly easier and reducing the cost.

In order to make the aforementioned and other features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
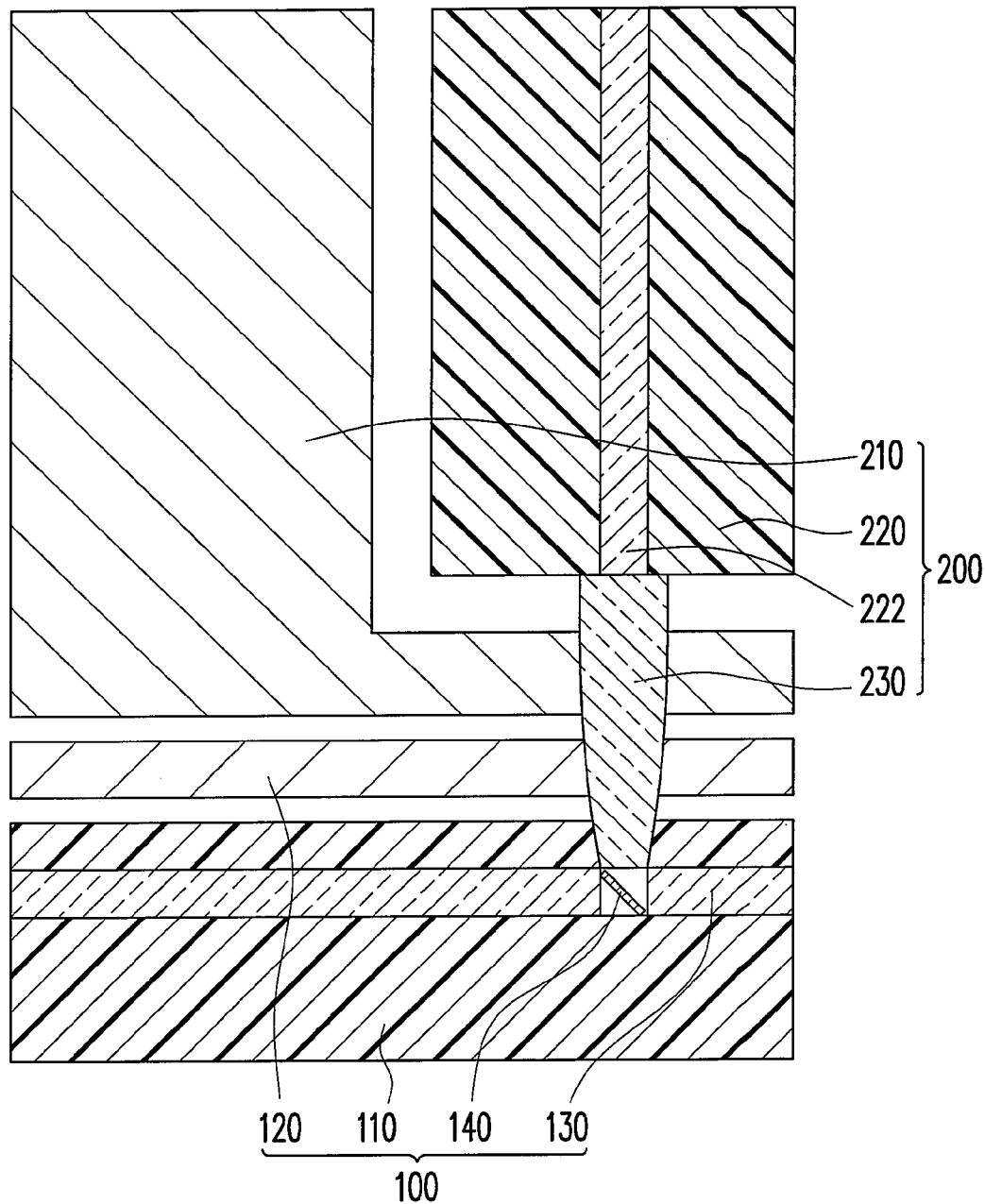
FIG. 1 is a cross-sectional view of an optical daughter card module installed on an optical parent card module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-sectional view of an optical daughter card module installed on an optical parent card module according to an embodiment of the present invention. Referring to FIG. 1, in this embodiment, an optical daughter card module 200 is suitable for being detachably installed on an optical parent card module 100. The optical parent card module 100 includes a parent card 110, a parent card positioning component 120 fixed to the parent card 110, and an input optical path 130 in the parent card 110. The optical daughter card module 200 includes a daughter card positioning component 210, a daughter card 220, and an optical intermediary component 230.

In particular, the daughter card positioning component 210 is detachably installed on the parent card positioning component 120, and the two components may provide spaces for metal circuit connection as well. The daughter card 220 is fixed to the daughter card positioning component 210, and has an output optical path 222. The optical intermediary component 230 is fixed to the daughter card positioning component 210. In addition, the optical parent card module 100 has a reflector 140 in the parent card 110, for reflecting a light from the optical intermediary component 230 into the input optical path 130.

It should be noted that in this embodiment, for example, the input optical path 130 is an input optical fiber, and the output optical path 222 is an output optical fiber.

Figure 2:
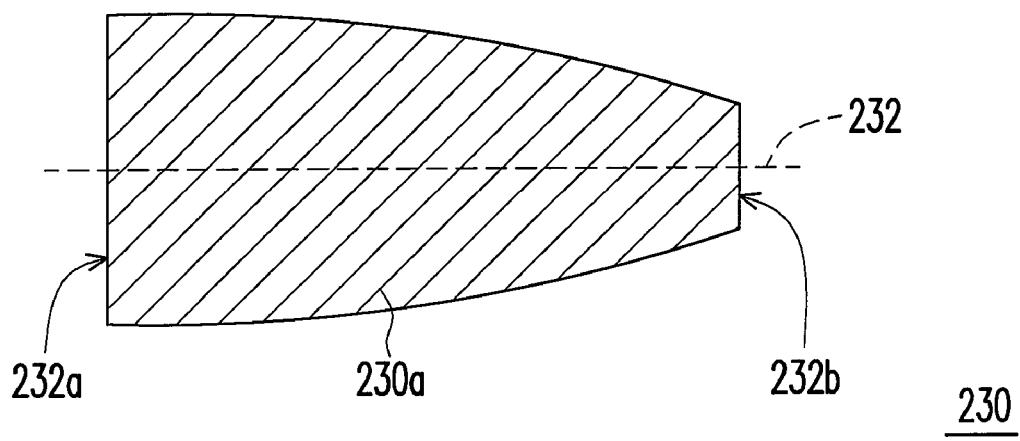
FIG. 2 is an enlarged cross-sectional view of an optical intermediary component in FIG. 1.

FIG. 2 is an enlarged cross-sectional view of the optical intermediary component in FIG. 1. Together referring to FIGS. 1 and 2, in this embodiment, the optical intermediary component 230 is suitable for guiding a light from the output optical path 222 into the input optical path 130. The optical intermediary component 230 includes a light guiding portion 230a extends along a light axis 232. The light guiding portion 230a has a light incident surface 232a and a light emitting surface 232b at two opposite ends thereof respectively. The light from the output optical path 222 passes through the light incident surface 232a and the light emitting surface 232b, and is guided into the input optical path 130.

In detail, the shape of the light guiding portion 230a is tapered from the light incident surface 232a to the light emitting surface 232b along the light axis 232, and the outer surface of the light guiding portion 230a is a convex curved surface. It should be noted that, as the area of the light incident surface 232a is greater than that of the light emitting surface 232b, a high alignment tolerance is provided between the output optical path 222 and the optical intermediary component 230, thus making the assembly easier. In addition, when the outer surface of the light guiding portion 230a is a convex curved surface, the length of the light guiding portion 230a can be reduced for a purpose of miniaturization.

Figure 3A:
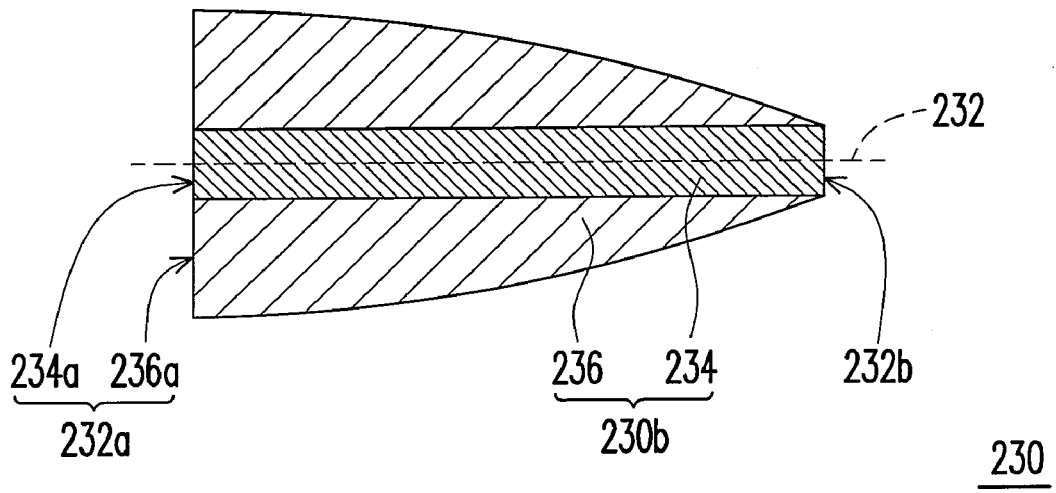
FIG. 3A is an enlarged cross-sectional view of an optical intermediary component according to another embodiment of the present invention.

FIG. 3A is an enlarged cross-sectional view of an optical intermediary component according to another embodiment of the present invention. Referring to FIG. 3A, the light guiding portion 230b of the optical intermediary component 230 includes an inner core 234 and an outer core 236. The inner core 234 extends along the light axis 232, and an end of the inner core 234 forms the light emitting surface 232b. The outer core 236 surrounds the outside of the inner core 234 about the light axis 232, and the shape of the outer core 236 is tapered from the light incident surface 232a to the light emitting surface 232b along the light axis 232. The outer surface of the light guiding portion 230b is, for example, a planar surface or a convex curved surface (referring to FIG. 3A, the outer surface of the light guiding portion 230b is a convex curved surface).

In particular, the refractive index of the inner core 234 may be different from that of the outer core 236, and the shape of the outer core 236 is tapered from the light incident surface 232a to the light emitting surface 232b along the light axis 232. Thereby, the light is concentrated on the inner core 234, and then output from the light emitting surface 232b of the inner core 234. Moreover, in this embodiment, the inner core 234 has an inner light incident surface 234a relative to the light axis 232, the outer core 236 has an outer light incident surface 236a relative to the light axis 232, and the inner light incident surface 234a and the outer light incident surface 236a form the light incident surface 232a.

In this embodiment, cross-sections of the inner core 234 perpendicular to the light axis 232 are in substantially the same shape, and the light emitting surface 232a, the inner light emitting surface 234a, and the outer light emitting surface 236a are all planar surfaces. In addition, the light incident surface 232a formed by the inner light emitting surface 234a and the outer light emitting surface 236a is also a planar surface, and the area of the light incident surface 232a is greater than that of the light emitting surface 232b.

Figure 3B:
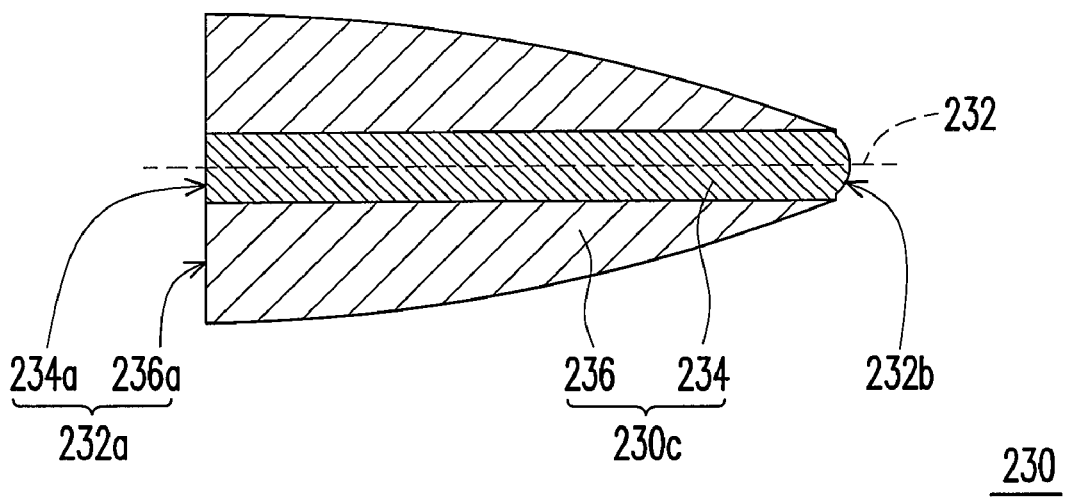
FIG. 3B is an enlarged cross-sectional view of an optical intermediary component according to another embodiment of the present invention.

FIG. 3B is an enlarged cross-sectional view of an optical intermediary component according to another embodiment of the present invention. Referring to FIG. 3B, the optical intermediary component in FIG. 3B is similar to that in FIG. 3A, and the difference is that the light emitting surface 232b of the light guiding portion 230c in FIG. 3B is a convex curved surface.

Figure 3C:
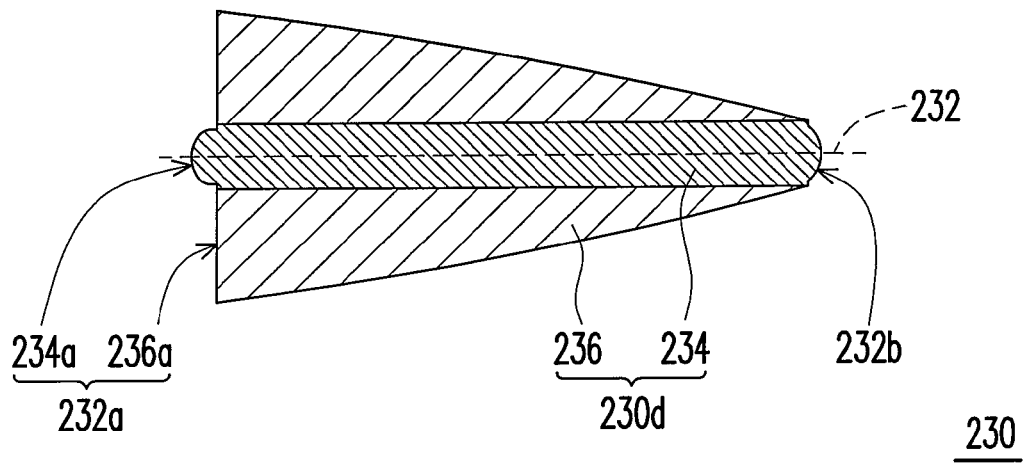
FIG. 3C is an enlarged cross-sectional view of an optical intermediary component according to another embodiment of the present invention.

FIG. 3C is an enlarged cross-sectional view of an optical intermediary component according to another embodiment of the present invention. Referring to FIG. 3C, the optical intermediary component in FIG. 3C is similar to that in FIG. 3A, and the difference is that the light emitting surface 232b and the inner light emitting surface 234a of the light guiding portion 230d in FIG. 3C are both convex curved surfaces, in which the inner light emitting surface 234a and the outer light emitting surface 236a form the light incident surface 232a.

Figure 3D:
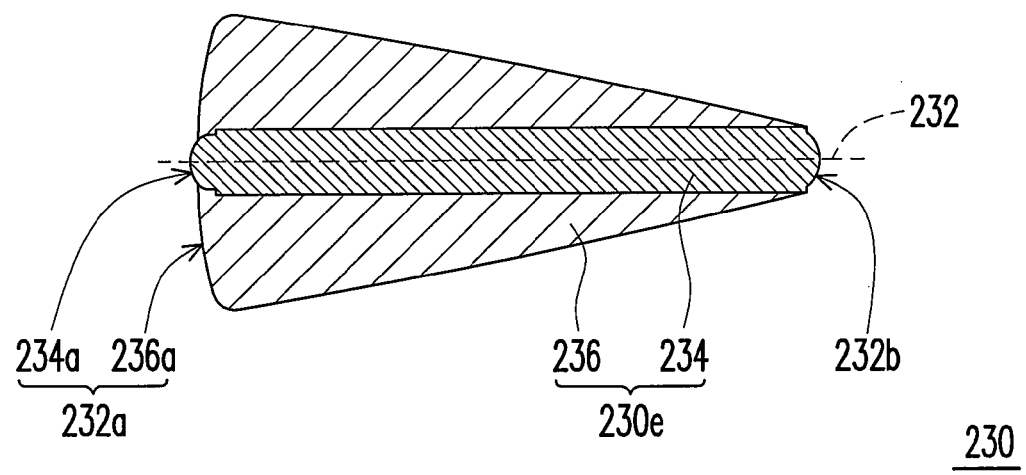
FIG. 3D is an enlarged cross-sectional view of an optical intermediary component according to another embodiment of the present invention.

FIG. 3D is an enlarged cross-sectional view of an optical intermediary component according to another embodiment of the present invention. Referring to FIG. 3D, the optical intermediary component in FIG. 3D is similar to that in FIG. 3A, and the difference is that the light emitting surface 232b, the inner light emitting surface 234a, and the outer light emitting surface 236a of the light guiding portion 230e in FIG. 3D are all convex curved surfaces, in which the inner light emitting surface 234a and the outer light emitting surface 236a form the light incident surface 232a of a convex curved surface.

Figure 4A:
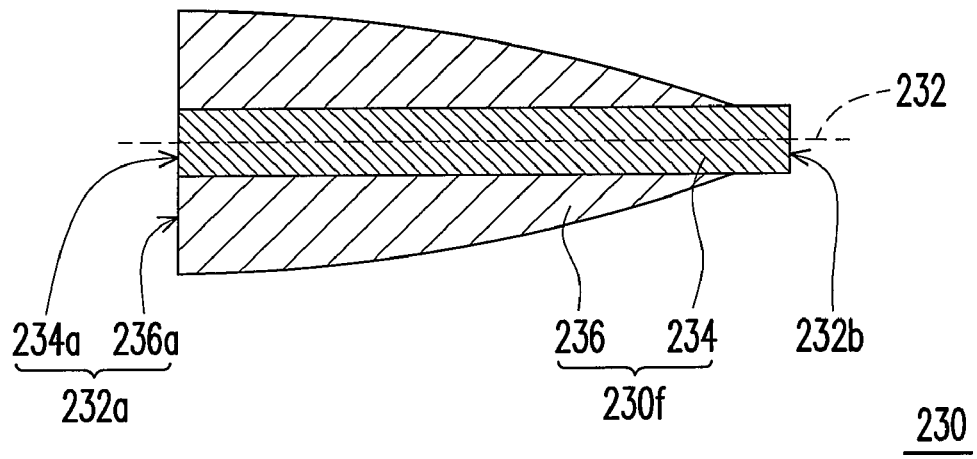
FIG. 4A is an enlarged cross-sectional view of an optical intermediary component according to still another embodiment of the present invention.

FIG. 4A is an enlarged cross-sectional view of an optical intermediary component according to still another embodiment of the present invention. Referring to FIG. 4A, the light guiding portion 230f of the optical intermediary component 230 includes an inner core 234 and an outer core 236. The inner core 234 extends along the light axis 232, and an end of the inner core 234 forms the light emitting surface 234b. The outer core 236 only surrounds a segment of the outer surface of the inner core 234 about the light axis 232, and the outer surface of the outer core 236 is a convex curved surface. In this embodiment, the shape of the outer core 236 is tapered from the light incident surface 232a to the light emitting surface 232b in a curve along the light axis 232.

In this embodiment, the inner core 234 has an inner light incident surface 234a relative to the light axis 232, the outer core 236 has an outer light incident surface 236a relative to the light axis 232, and the inner light incident surface 234a and the outer light incident surface 236a form the light incident surface 232a.

Figure 4B:
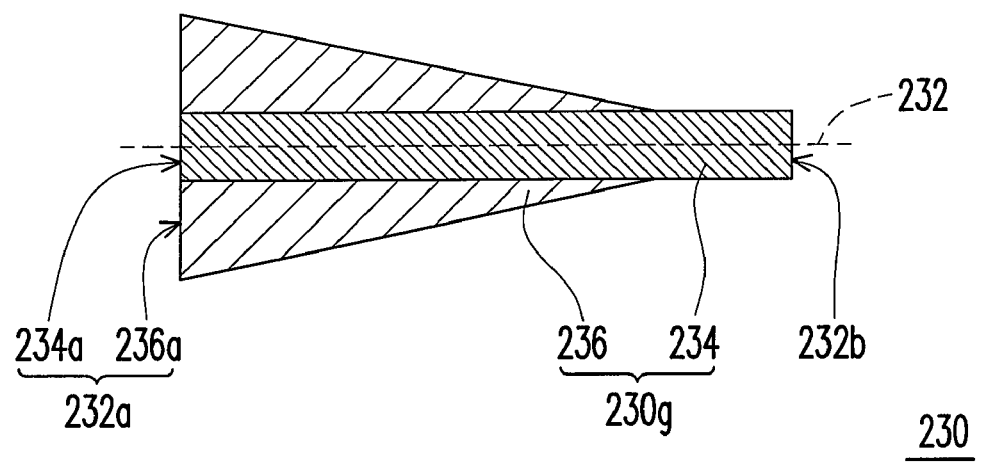
FIG. 4B is an enlarged cross-sectional view of an optical intermediary component according to still another embodiment of the present invention.

FIG. 4B is an enlarged cross-sectional view of an optical intermediary component according to still another embodiment of the present invention. Referring to FIG. 4B, the optical intermediary component in FIG. 4B is similar to that in FIG. 4A, and the difference is that the outer core 236 of the light guiding portion 230g in FIG. 4B only surrounds a segment of the outer surface of the inner core 234 about the light axis 232, and the shape of the outer 236 is tapered from the light incident surface 232a to the light emitting surface 232b along the light axis 232. In this embodiment, the shape of the outer core 236 is tapered from the light incident surface 232a to the light emitting surface 232b in a curve along the light axis 232.

Figure 5:
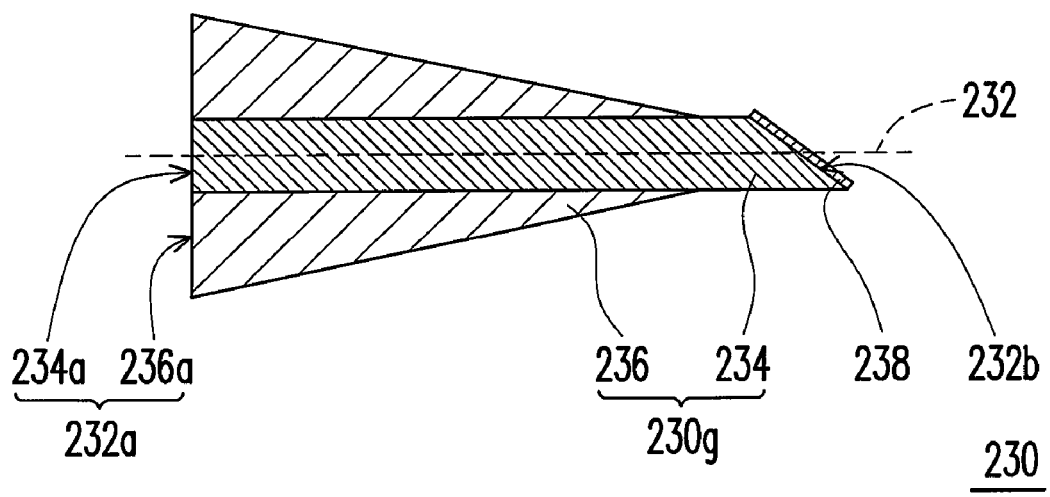
FIG. 5 is an enlarged cross-sectional view of an optical intermediary component according to yet another embodiment of the present invention.

FIG. 5 is an enlarged cross-sectional view of an optical intermediary component according to yet another embodiment of the present invention. Referring to FIG. 5, the optical intermediary component in FIG. 5 is similar to that in FIG. 4B, and the difference is that the optical intermediary component 230 in FIG. 5 further includes a reflective layer 238. The reflective layer 238 is disposed on the light emitting surface 232b, and an acute angle is formed between the light emitting surface 232b and the light axis 232. The reflective layer 238 has a similar function as the reflector 140 in FIG. 1, i.e., to reflect the light from the optical intermediary component 230 into the input optical path 130.

In view of the above, in the present invention, a large alignment tolerance is provided between the output optical path and the optical intermediary component, thus making the assembly easier. Moreover, besides being integrated into an optical daughter card module, the optical intermediary component may also be integrated into an optical parent card module, so as to achieve the same purpose of providing a large alignment tolerance between the output optical path and the optical intermediary component.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical intermediary component, suitable for guiding a light from an output optical path into an input optical path, wherein a width of the output optical path is greater than a width of the input optical path, the optical intermediary component comprising:
   a light guiding portion, extending along a light axis, and having a light incident surface coupled to the output optical path and a light emitting surface coupled to the input optical path at two opposite ends thereof respectively, wherein the light from the output optical path passes through the light incident surface and the light emitting surface in sequence and is then guided into the input optical path, and an area of the light incident surface is greater than that of the light emitting surface, the light guiding portion further comprising:
   an inner core, extending along the light axis, wherein an end of the inner core forms the light emitting surface; and
   an outer core, surrounding the inner core along the light axis, and the light is transmitted in both of the inner core and the outer core.

2. The optical intermediary component according to claim 1, wherein the shape of the light guiding portion is tapered from the light incident surface to the light emitting surface along the light axis.

3. The optical intermediary component according to claim 1, wherein an outer surface of the light guiding portion is convexly curved along the light axis.

4. The optical intermediary component according to claim 1, wherein the light incident surface is a planar surface or a convex curved surface.

5. The optical intermediary component according to claim 1, wherein the light emitting surface is a planar surface or a convex curved surface.

6. The optical intermediary component according to claim 1, wherein a refractive index of the inner core is different from that of the outer core.

7. The optical intermediary component according to claim 1, wherein the shape of the outer core is tapered from the light incident surface to the light emitting surface along the light axis.

8. The optical intermediary component according to claim 1, wherein the outer core only covers a segment of the inner core along the light axis.

9. The optical intermediary component according to claim 1, wherein the outer surface of the outer core is convexly curved along the light axis.

10. The optical intermediary component according to claim 1, wherein the inner core has an inner light incident surface relative to the light axis, the outer core has an outer light incident surface relative to the light axis, and both of the inner light incident surface and the outer light incident surface form the light incident surface.

11. The optical intermediary component according to claim 10, wherein the inner light incident surface is a planar surface or a convex curved surface.

12. The optical intermediary component according to claim 10, wherein the outer light incident surface is a planar surface or a convex curved surface.

13. The optical intermediary component according to claim 1, further comprising:
   a reflective layer, disposed on the light emitting surface for reflecting light, wherein an acute angle is formed between the light emitting surface and the light axis.

14. An optical daughter card module, suitable for being detachably installed on an optical parent card module provided with a parent card, an input optical path in the parent card, and a parent card positioning component fixed to the parent card, the optical daughter card module comprising:
   a daughter card positioning component, detachably installed on the parent card positioning component;
   a daughter card, fixed to the daughter card positioning component, and provided with an output optical path, wherein a width of the output optical path is greater than a width of the input optical path;
   an optical intermediary component, fixed to the daughter card positioning component, further comprising:
   a light guiding portion, extending along a light axis, and having a light incident surface coupled to the output optical path and a light emitting surface coupled to the input optical path relative to the light axis, wherein a light from the output optical path passes through the light incident surface and the light emitting surface and is then guided into the input optical path, an area of the light incident surface is greater than that of the light emitting surface, and an area of the light incident surface is greater than that of the output optical path, the light guiding portion further comprising:
an inner core, extending along the light axis, wherein an end of the inner core forms the light emitting surface; and
an outer core, surrounding the inner core along the light axis, and the light is transmitted in both of the inner core and the outer core.

15. The optical daughter card module according to claim 14, wherein the shape of the light guiding portion is tapered from the light incident surface to the light emitting surface along the light axis.

16. The optical daughter card module according to claim 14, wherein a refractive index of the inner core is different from that of the outer core.

17. The optical daughter card module according to claim 14, wherein the shape of the outer core is tapered from the light incident surface to the light emitting surface along the light axis.

18. The optical daughter card module according to claim 14, wherein the outer core only covers a segment of the inner core along the light axis.

19. The optical daughter card module according to claim 14, wherein the outer surface of the outer core is convexly curved along the light axis.

20. The optical daughter card module according to claim 14, further comprising:
a reflective layer, disposed on the light emitting surface for reflecting light, wherein an acute angle is formed between the light emitting surface and the light axis.

* * * * *